Sept. 22, 1953 W. N. LUNDAHL 2,653,247
X-RAY THICKNESS GAUGE

Filed May 8, 1948 3 Sheets-Sheet 1

INVENTOR
Walter N. Lundahl.
BY
ATTORNEY

Patented Sept. 22, 1953

2,653,247

UNITED STATES PATENT OFFICE 2,653,247

X-RAY THICKNESS GAUGE

Walter N. Lundahl, Pikesville, Md., assignor to Westinghouse Electric Corporation, East Pittsburgh, Pa., a corporation of Pennsylvania Application May 8, 1948, Serial No. 25,953

8 Claims. (Cl. 250—71)

My invention relates to X-ray devices and, in particular, relates to arrangements for employing X-rays to measure the thickness of sheet materials.

In many cases where materials, such as steel, for example, are being rolled or otherwise produced in the form of sheets or strips, it is necessary to gauge continuously the thickness of the material being turned out in order to insure uniformity of the product. While mechanical thickness gauges have been used, they have many undesirable properties and limitations. They almost invariably have to make contact with the material, and this may mark or mar it; or they may be difficult to use because of its high temperature; or they may strictly limit the speed with which the material may be turned out of the producing apparatus. Since the absorption of X-rays increases with the thickness of a given material, attempts have been made to gauge thickness of sheet material being turned out by machines by irradiating them with a beam of X-rays and measuring the amount of X-ray absorption.

There are likewise many instances where, even with materials of uniform thickness, it is desirable to determine whether the composition or other pertinent properties of the material are uniform from point to point therein; and in many instances, the absorption of X-rays passing through the material may be employed for this purpose.

However, difficulty has been found in the development of apparatus thus employing X-rays in providing an incident X-ray beam which is not subject to such variations in intensity and wave length from time to time as would seriously interfere with the accuracy of the absorption measurements. Unless the voltage employed to generate the X-rays and the temperature of the X-ray tube cathode are maintained constant to an extremely high degree of precision, considerable apparent variations in the absorption for a given thickness of metal are found.

I have found that the errors due to variations of the type just mentioned may be eliminated by a system in which the intensity of X-rays transmitted through the sample is compared with the intensity of X-rays emanating from the same source, or a substantially identical source, which are transmitted through a standard body or sheet. In accordance with the embodiment of my invention described in detail herein, the above-mentioned method is carried out by irradiating the sample with an X-ray beam emanating from one X-ray tube during one half cycle of an alternating-current power supply, and irradiating a standard with X-rays emanating from an approximately identical X-ray tube energized from the same power supply during the other half cycle of the alternating voltage. This results in the production, during alternate half cycles of a power supply, of two different X-ray beams, one of which has been transmitted through the sample and the other of which has been transmitted through the standard. The two transmitted beams then act on a suitable intensity measuring device to produce output currents in alternate half cycles of the power supply which are, respectively, measures of the intensity of the two transmitted beams.

By a suitable electronic switching device, the sensitivity of the device measuring the intensity of the transmitted beams is varied, by automatic volume control methods, to produce a substantially constant output current pulse from the measuring device during those half cycles of the power supply in which the measuring device is irradiated by the more intense of the two X-ray beams. As a result, the output current of the same measuring device during those half cycles in which it measures the X-rays transmitted through the thicker of the two materials, is, for practical purposes, proportional to the ratio of the intensity of the X-rays transmitted through the sample and the intensity of the X-rays transmitted through the standard. This ratio is substantially the same for a given sample and a given standard, over a wide range of variations in anode voltage or filament voltage of the X-ray tubes, and is also substantially independent of any gradual variations or drift in the sensitivity and other characteristics of the measuring device itself. A system is thus obtained in which errors due to such variables as have been described in the preceding paragraphs, are eliminated.

One object of my invention is, accordingly, to provide an arrangement for measuring the thickness of sheet and other materials by means of absorption of X-rays or other forms of radiation which is free from errors which have interfered with the accuracy of prior art measuring systems.

Another object of my invention is, accordingly, to provide a thickness measuring arrangement which may produce accurate measurements without physically contacting the material being gauged.

Another object of my invention is to provide a method of measuring the thickness of materials which is capable of accurate operation, even with materials which may be at extremely high temperatures.

Still another object of my invention is to provide an arrangement for measuring the absorption ability in a given material of X-ray and other forms of radiant energy in which the accuracy of the results is not vitiated by substantial variations in the electrical characteristics of the power systems supplying energy to the radiating source.

Still another object of my invention is to provide an arrangement for measuring the absorption ability for X-rays or other radiation in test materials which is substantially unaffected by variations in the characteristics of the radiation-measuring device employed as a component thereof.

Still another object of my invention is to provide a circuit network for altering the wave form of a controlled quantity comprising alternate pulses of different amplitudes in such a way as to render a discriminator device of the type about to be referred to in the immediately following paragraph more sensitive to differences in the amplitude of said successive pulses.

Still another object of my invention is to provide a novel type of discriminator device which will produce across its output terminals a voltage which is proportional to the algebraic value of the difference between successive pulses which are alternately of greater and smaller amplitude.

A still further object of my invention is to provide a novel type of relay and control circuit therefor for varying the position of a mechanism, such as a rolling mill, in response to the algebraic value of a controlled voltage such as the output voltage of the discriminator referred to in the immediately preceding paragraph.

Still another object of my invention is to provide a novel measuring device of high impedance for indicating the relative values of two electrical quantities.

Other objects of my invention will become apparent upon reading the following description, taken in connection with the drawings, in which.

Certain features disclosed herein are shown and claimed in application Serial No. 753,014 of F. B. Marshall and J. W. Coltman filed about June 30, 1947 for an X-ray Thickness Gauge, and an application Serial No. 776,508 of R. L. Longini filed about September 27, 1947 for an X-ray Thickness Gauge.

Figure 1:
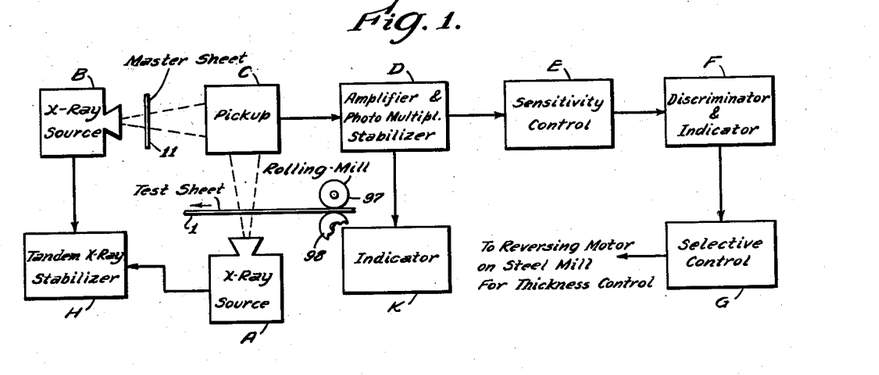
Figure 1 is a block diagram showing the general layout of a thickness-measuring device for sheet metal passing through a rolling mill, which system embodies the principles of my invention referred to above.

Referring to Fig. 1 in detail, the general diagram of the system by which I have chosen to illustrate my invention shows a test sheet 1 emerging from the rolls 97 and 98 of a rolling mill; the system embodying my invention being intended to indicate variations in the thickness of this test sheet while it emerges from the rolls and to automatically vary the setting of the rolls to maintain substantial constancy in said thickness. The components of the system above mentioned comprises a first X-ray source A emitting an X-ray beam which passes through the test sheet, and a second X-ray source B emitting a beam which passes through a master sheet or standard sheet 11. The X-ray sources A and B are so positioned that their beams after passing through the sheets above mentioned irradiate a pick-up device C which produces an output current flowing to a combined amplifier and photo-multiplier stabilizer, D. The output of the network D passes through a sensitivity control network E to a discriminator and indicator F which, in turn, impresses its output on a selective control network G. The output of the control network G is impressed on a reversing motor which controls the setting of the rolls 97 and 98 in the rolling mill. The output of the amplifier and photo-multiplier stabilizer D is likewise impressed on a novel type of indicator K. The above-mentioned system likewise embodies a stabilizer H for the two X-ray tubes A and B which acts to maintain their anode currents always equal to each other.

Figure 2:
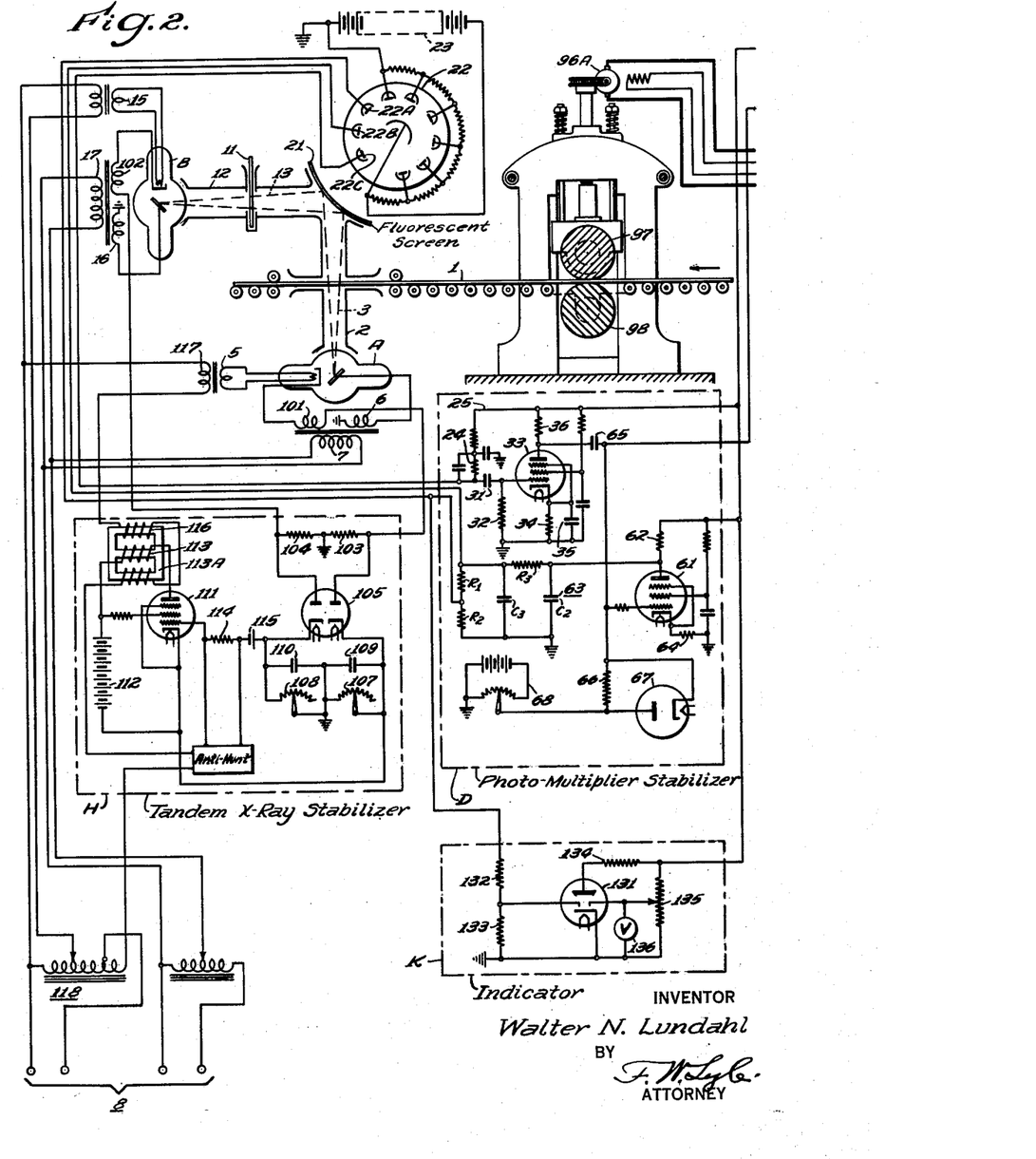
Figs. 2 and 3 are schematic diagrams of the electrical circuits constituting the complete arrangement and showing in detail the separate units indicated in the block diagram of Fig. 1.

Referring in detail to Fig. 2, a material of which the thickness is to be measured, which may, for example, be a band 1 of sheet steel passing through a rolling mill, is arranged to pass continuously in front of a shield 2 having an aperture through which an X-ray beam 3 is being projected from an X-ray tube A of suitable type. The X-ray tube A has its cathode excited from a transformer winding 5 and has voltage impressed on its anode from a second transformer winding 6 which may be energized by a primary winding 7 supplied from a suitable alternating-current power source 8 not shown. A standard specimen or master sheet 11, which may, for example, be a piece of sheet steel having the thickness which it is desired to have the sheet 1 duplicate, is arranged to be irradiated with X-rays through an aperture in a second shield 12 by an X-ray beam 13 from an X-ray tube B which is preferably, although not necessarily, a tube matched to the X-ray tube A. The tube B has its cathode supplied from a secondary winding 15 and its anode supplied from secondary windings 16 and 102. The windings 15, 16 and 102 are matched with the windings 5, 6 and 101, respectively, and energized from a primary winding 17, which is preferably one matched with the transformer winding 7 and supplied from source 8.

The X-ray beams 3 and 13 are arranged to be coincident on a fluorescent screen 21, and a photo-sensitive tube 22 is arranged to be energized by the light emitted from the screen 21. We have found a very practical arrangement in having the photo-sensitive tube 22 consist of a photo-multiplier tube of which many suitable types are well known today in the tube art. Such a tube produces an amplification of the photoelectric current from the cathode by the successive ejection of secondary electrons from a series of electrodes called dynodes. As is well known, such tubes produce an output current of very substantial intensity, even when irradiated by relatively low intensity light. The amplification of such a device may be varied by changing the voltage on one or more of the dynodes such as those indicated at 22A and 22B in Fig. 2. The tube 22, as shown in the drawings, is purely symbolical, rather than a structural representation of such a photo-multiplier tube.

The photo-sensitive cathode of the tube 22 is preferably connected to the negative terminal of a voltage source 23 having its positive terminal grounded. The output anode 22C of the tube 22 is connected through a suitable resistor 24 to the lead 25 from the positive terminal of a second voltage source 26 which has its negative terminal grounded. This arrangement is such that the resistor 24 is traversed by a current which is, from instant to instant, a replica of the intensity variations of the radiation incident upon the screen 21.

Since the voltage applied to the anodes of the X-ray tubes A and B is alternating, they irradiate the specimens 1 and 11, respectively, only in alternate one-half cycles of the alternating-voltage supply 8. The transformer windings 7 and 17 are so poled that the anode of the X-ray tube A is positive during one-half cycle and the anode of X-ray tube B is positive during the second half of each cycle. It will be seen to result from this that the beams 3 and 13, respectively, energize the photomultiplier tube 22 in alternate half cycles of the source 8. The output current from tube 22, flowing through resistor 24, therefore, consists of a series of pulses, alternate members of the series, respectively, being proportional in amplitude to the intensity of the radiations transmitted through the sample 1 and the standard 11. These pulses are further amplified by a tube 33 resulting in an output measurable across a resistor 36.

Figure 4:
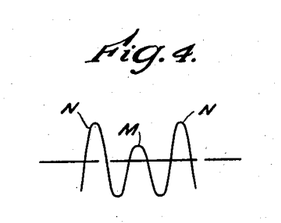
Figs. 4 through 9 are graphs illustrating wave forms produced at various points in the electronic circuits shown in detail in Figs. 2 and 3.
Figure 5:
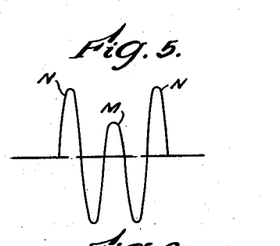

Fig. 4 illustrates the variation with time of the current through the resistor 24, the pulses M being measures of the intensity of the transmitted radiation in beam 3 passing through the sample 1, and the pulses N being measures of the intensity of the radiation of the transmitted beam passing through the standard 11 on alternate half cycles of the power source 8. Fig. 5 shows the variation with time of the current through resistor 36.

Figure 3:
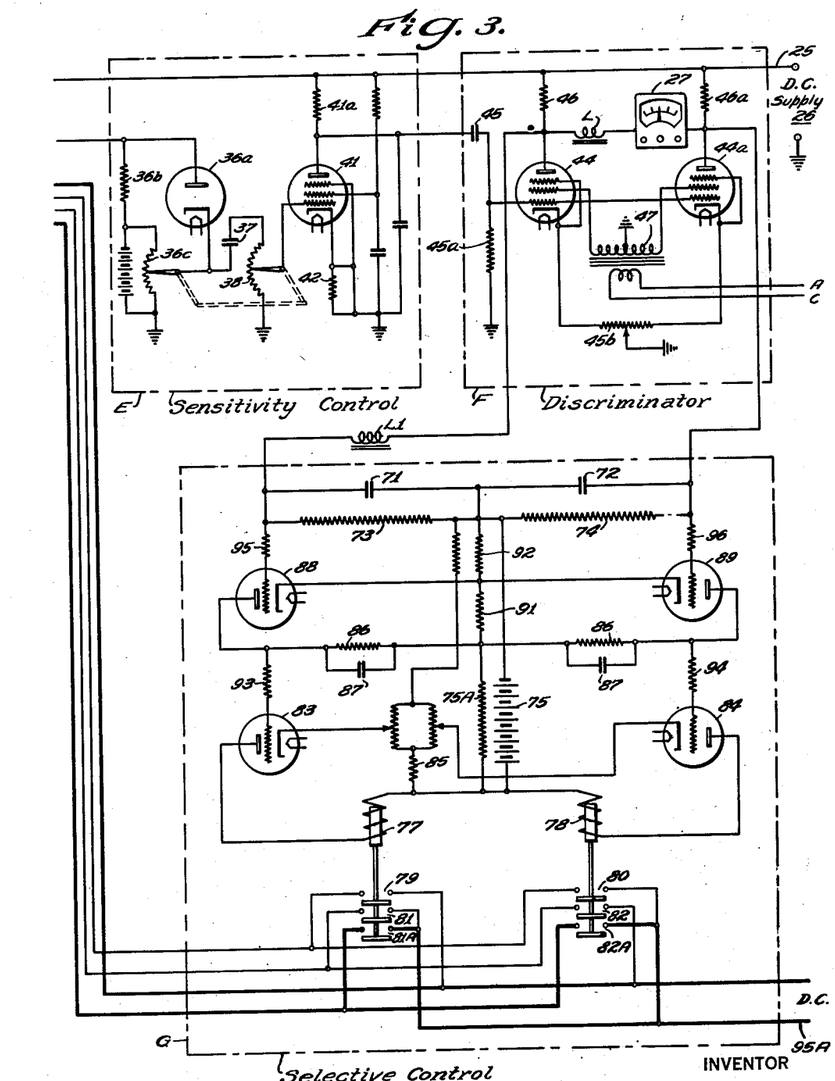

The remainder, now about to be described, of the circuit network of Figs. 2 and 3 has the following purposes: First stabilizer D impresses gain control voltages on the photo-sensitive tube 22 of such character that the larger of the two pulses of current M and N through resistor 36 are substantially always of the same amplitude regardless of any variations in absolute value of the transmitted radiation in beam 13 and also regardless of any variations from time to time in the characteristics of elements such as amplifier 33 or photo-sensitive tube 22.

Since one or the other of the amplitudes M and N is always equal to a constant quantity which amplitude is dependent only on the setting of the stabilizer, the magnitude of the smaller pulse is proportional to the ratio of transmission of the thicker of sheets 1 and 11 to the transmission of the thinner of these two. The difference between these two pulses is an exponential function of the difference in thickness of the sample and standard and is independent in magnitude of the direction of this difference. For small differences of thickness the difference in pulse magnitude is proportional to the thickness difference. The phase of the pulse difference indicates which pulse corresponds to the standard and which corresponds to the sample. Meter 27 in Fig. 3 is so arranged that the phase of the difference determines its direction of deflection.

Turning in detail to the circuit for effecting the above-mentioned results, a coupling capacitor 31 and a resistor 32 are connected between the anode 22c of the photo-sensitive tube 22 and ground, the common terminal of capacitor 31 and resistor 32 being coupled to a control electrode of the amplifier tube 33 having its cathode grounded through a cathode resistor 34 shunted by a capacitor 35. The anode of the tube 33 is connected through a resistor 36 to the positive lead 25. The foregoing connections are such as to produce in resistor 36 current pulses M and N which substantially duplicate, with reversed polarity, the output current pulses of the multiplier tube 22.

The anode of tube 33 is connected through a clipper network comprising a diode 36a connected in multiple with a channel comprising a resistor 36b connected to ground through a voltage divider 36c, the cathode of the tube 36a being connected to the tap-point on a variable bias-voltage source 36c. The cathode of the tube 36a is likewise connected to ground through a capacitor 37 in series with a resistor 38 running. A variable tap-point on the resistor 38 is connected to the control electrode of an amplifier tube 41 which draws current from the positive lead 25 through a resistor 41a and which has its cathode connected to ground through a resistor 42.

Figure 6:
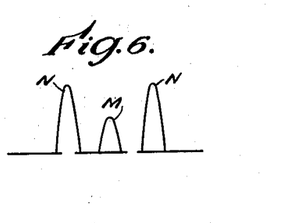

The output voltage of the photo-multiplier 22 being of the type shown in Fig. 4, its wave form will be altered by the tube 33 so that the output of the latter has the wave form illustrated in Fig. 5. The effect of varying the setting of the simultaneously controlled variable taps on the tension dividers 36 and 38 is to clip off the lower portions of the voltage waves in Fig. 5 and produce a wave of the form illustrated in Fig. 6 on the input to amplifier 41. The effect of the capacitance and inductance inherent in the network connected with amplifier 41 is to produce at its output terminals a wave form of the type indicated in Fig. 7. It will be noted that the ratio of the amplitude of the waves M and N in Fig. 6 is much larger than the ratio of the amplitude of the corresponding waves M and N in Figs. 4 and 5. Thus the effect of the network in the sensitivity control device E which has just been described is to improve the sensitivity of the circuit by accentuating the percentage difference between the input waves M and N and this sensitivity may be varied at will by altering the position of the variable tap points on the potential device 36c and 38.

The output of the sensitivity control device E is impressed on the control electrodes of a pair of similar amplifier tubes 44 and 44a tthrough a capacitor 45 and resistor 45a. The cathodes of the two tubes 44 and 44a are connected to each other through a resistor 45b having a variable tap which is connected to ground. The anodes of the tubes 44 and 44a are respectively connected to the positive line-wire 25 through equal resistors 46 and 46a. A second pair of control electrodes in the tubes 44 and 44a are connected to opposite terminals of the secondary winding 47 having its midpoint grounded and energized by a primary winding connected to the same voltage source 8 as that supplying current to the anodes of the X-ray tubes A and B. The anodes of the tubes 44 and 44a are connected to each other through an inductor L and a direct-current meter 27 having a zero at the center of its scale.

Figure 8:
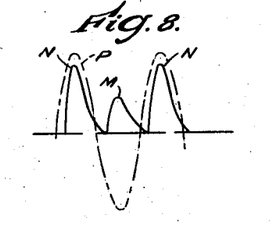
Figure 9:
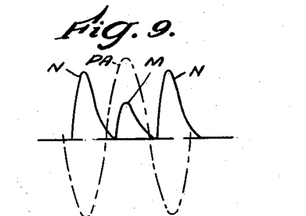

The voltage waves M and N impressed by the sensitivity control network E above described appear with this same sign on one set of control grids of the tubes 44 and 44a. However, the transformer secondary 47 impresses on the other set of control grids of those tubes voltages P and PA which are respectively 180° out of phase with each other, as indicated in Figs. 8 and 9. The tubes 44 and 44a are biased by the resistor 45b through which they are grounded so that they conduct current at only such times as the voltage waves P and N impressed on their control electrodes are both positive. Thus the tube 44a has the alternating voltage P and the pulsating voltage N both positive during one half cycle of the alternating voltage P as shown in Fig. 8 and the tube 44a has positive voltages PA and M impressed on its control electrodes simultaneously only during the other half cycles of the alternating-current secondary 47. Hence tube 44 will conduct current through the resistor 46 only when the X-ray source B is energized by one half cycle of the alternating voltage source 8, and correspondingly the tube 44a will produce current flow in the resistor 46a only when the X-ray source A is energized by the alternating voltage source 8.

If the pulses M and N are equal to each other in amplitude at any time, the voltage drop produced in the resistor 46 will be equal to the voltage drop produced by current flow in the resistor 46a and the voltage difference between the anodes of the tube 44 and 44a will be an alternating one having a value which averages to zero over any integral number of cycles of the alternating voltage source 8. The needle on the meter 27 will then remain at the zero position since this alternating voltage can send no substantial current through the inductor L. However, if the pulses M (produced by X-ray source A irradiating test sheet 1) are smaller in value than the pulses N, the voltage drop through the resistor 46a will be less than the voltage drop through the resistor 46 and there will be a net direct-current flowing through meter 27 from the anode of tube 44a to that of tube 44; and this will be indicative of a test sheet 1 thinner than master sheet 11. On the other hand, when the test sheet 1 is thicker than master sheet 11 so that the amplitude of the pulse N is greater than that of the pulse M, there will likewise be a direct-current flow through meter 27 but it will be of opposite polarity and hence from the anode of the tube 44 to the anode of the tube 44a. Thus there will exist between the anodes of the tubes 44 and 44a an output voltage which is proportional in magnitude and sign to the excess of the amplitude of pulses N over the amplitude of pulse M.

Figure 7:
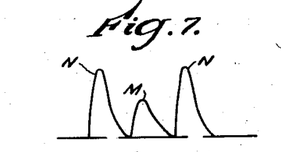

The network comprising the elements 44 through 47 comprises the discriminator F generally indicated in Fig. 1, and the output voltage of this discriminator taken off between the anodes of the tubes 44 and 44a has a value which varies in magnitude and sign with the algebraic difference between the amplitudes of the waves M and N in Fig. 7.

The portion of the stabilizer D not yet described has the property of insuring that, regardless of the absolute value of the transmitted radiation 13, and of changes in sensitivity of the photo-sensitive tube 22, the height of the larger of the pulses M and N which pass through the output resistor 36, remains substantially constant. The tube 61 has its anode connected through a resistor 62 to the positive lead 25. The anode of tube 61 is likewise connected to volume control electrodes 22A and 22B in photo-sensitive tube 22 through grounded resistors $R_1$, $R_2$, and to ground through a pi filter 63 comprising resistor $R_3$ and capacitors $C_2$ and $C_3$. The cathode of the tube 61 is connected to ground through a cathode resistor 64 and its control electrode is connected through a capacitor 65 to the anode of amplifier tube 33. The control electrode of tube 61 is likewise connected through a resistor 66 in multiple with a rectifier 67 which may be of the diode vacuum tube type to the negative terminal of a voltage source 68 having its positive terminal grounded.

The result of the above-described connections is that tube 61 is connected in shunt across filter 63 which derives its voltage from source 25 through resistor 62, and that filter 63 provides the operating voltage for the gain control electrodes 22A and 22B in photo-multiplier tube 22. This operating voltage is adjusted by the magnitude of the pulses M and N.

The larger of pulses M and N in the output resistor 36 of amplifier tube 33 are impressed as a series of short positive pulses on the input electrode of tube 61, causing it to periodically discharge the capacitors of filter 63. Between these periodic discharges charge flows into the capacitors of filter 63 through resistor 62 from source 26. As a result, the voltage of capacitor $C_3$ in filter 63 has a sawtooth ripple of small magnitude. Filter 63 operates thus until a decrease in thickness of sample 1 causes a pulse M or N, which is larger than its immediate predecessors to appear on resistor 36. Such a pulse, let us say M, will impress a more positive voltage on resistor 66 and on the control electrode of tube 61, causing the latter to become more conductive, and the capacitor $C_3$ in filter 63 will discharge further. The potential impressed on the automatic volume control electrodes 22A and 22B of tube 22 thus becomes less positive and the current flow through resistor 24 decreases. Accordingly, the gain of the photo-multiplier tube 22 is reduced, and the current increase through resistor 36 which produced the original change is counteracted. Since tubes 33 and 61, together with their attendant circuits, are designed to be extremely sensitive to small changes in voltage of their control electrodes, the net result is that the current flowing through resistor 36 during pulses M is reduced again substantially to the value it had before the above-mentioned corrective changes were set in action by current increase through resistor 36 during the M pulse phase.

It will be noted that the capacitor $C_3$ of filter 63, connected between the gain control electrode 22B and ground, acquires its charge from the voltage source 26 through resistor 62, but is prevented from attaining the full source voltage by being periodically partially discharged by the current pulses through the control tube in accordance with the magnitude of pulses M and N as described above. The resistor 62 is so proportioned relative to capacitor $C_3$ that, while this charge on capacitor $C_3$ gradually rises through resistor 62 during a half cycle of source 8, the amount of this increase in the voltage of capacitor $C_3$ is small. Thus the gain of the photo-multiplier tube 22 is set by the control tube 61 to hold the pulse M or N at a constant level. If the pulse immediately following such an adjustment of the voltage of capacitor $C_3$ is not materially greater than its predecessor it will not cause tube 61 to discharge that capacitor, and the gain of photomultiplier tube is left substantially at this same value by that pulse. Thus the gain of the measuring tube 22 is controlled to maintain the greater of the two pulses M and N substantially constant.

Though the signal current flowing through the resistor 36 consists of a series of pulses which fall substantially to zero near the end of every half cycle of voltage of source 8, the use of capacitor coupling between the photo-multiplier anode 22 and the amplifier tube 33 and likewise between the amplifier tube 33 and the control tube 61 results in the loss of a base reference level. Since a capacitor cannot pass direct current, the voltage output of the capacitor 65 would, in the absence of the rectifier tube 67, consist of an alternation both positive and negative about a base line or zero level which would be determined by the areas and shapes of both pulses M and N. The rectifier 67, however, permits the passage to ground of current whenever its cathode is negative with respect to its anode, thus charging the condenser 65 to a direct-current potential such that the cathode of the rectifier 67 goes negative at the interval between pulses only by the very slight amount necessary to make up for the loss of charge through the resistor 66 during the positive swing of the pulse. Thus the voltage across the resistor 66 falls substantially to zero between pulses, and the voltages on the control grids of the tubes 61 during the pulses are essentially measured individually from the true zero level.

Turning now to the operation of discriminator F to automatically regulate the rolling mill to maintain the thickness of test sheet 1 constant, the output voltage of the discriminator F is connected to the input of a selective control network G also shown in Fig. 3. Its input terminals are spanned by a pair of equal capacitors 71 and 72 through a choke L1 which are respectively in parallel with a pair of resistors 73 and 74. The common terminal of the resistors 73 and 74 is connected to the negative terminal of the voltage source 75 having its positive terminal connected through the energizing windings 77 and 78 of a pair of relays, which respectively close contacts 79, 81, 81A and contacts 80, 82, 82A when said windings are energized by currents larger than a predetermined value. The windings 77 and 78 are connected respectively to the anodes of a pair of amplifier tubes 83 and 84 having their cathodes connected through variable taps to a voltage divider 85 which spans the source 75. The positive terminal of the voltage source 75 is likewise connected through a resistor 75A and two similar networks each comprising a resistor 86 shunted by a capacitor 87 to the respective anodes of a second pair of amplifier tubes 88 and 89. The cathodes of the tubes 88 and 89 are connected to a tap point on a pair of resistors 91, 92 which are connected in series between the common terminal of the resistors 86 and the common terminal of the resistors 73 and 74. The anodes of the tubes 88 and 89 are respectively connected through resistors 93 and 94 to control electrodes in the tubes 83 and 84 and control electrodes in the tubes 88 and 89 are, respectively, connected through resistors 95 and 96 to the output terminals of the discriminator F.

The test sheet 1 is of the same thickness as master sheet 11 as long as the voltage impressed by the output terminals of the discriminator F is, as has already been pointed out, a pure alternating one; the control electrodes of the tubes 88 and 89 will have the same potential relative to their cathodes and the anode currents drawn by these tubes through the resistors 86 will be identical. Hence the voltages impressed in the control electrodes of the tubes 83 and 84 will likewise be identical and the anode currents of the latter tubes flowing respectively through the relays 77 and 78 will be identical. The tap points on the potential divider 85 are initially adjusted so that the currents flowing through the energizing windings of the relays 77 and 78 are just insufficient to move their contactors 79 through 82 to closed position. If now the test sheet 1 becomes thicker than master sheet 11, anode of tube 44 has an average value which is positive relative to the anode of tube 44A, as has been pointed out above. Hence this means that tube 89 will draw a reduced current through its resistor 86 and that the control electrode of tube 84 becomes more positive. Hence the voltage of the control electrodes of the tube 88 will be more positive than that in tube 89, and hence tube 88 will draw more current from the source 75 than will tube 89. Since tubes 88 and 89 both draw current from source 75 through resistors 75A, the current flowing from the source 75 through tube 84 and winding 78 will increase above the value above described as existing when the thickness of test sheet 1 is the same as that of master sheet 11. When this increase reaches a preselected value corresponding to the tolerance allowed for sheet 1, contacts of relay 78 will be moved to closed circuit-position. In short, as long as the radiation transmitted through the test sheet equals the radiation transmitted through the master sheet, relays 77 and 78 will both remain in open circuit position. However, if the radiation transmitted through the test sheet exceeds by a predetermined tolerance that transmitted through the master sheet, one of the relays will close its bridging contacts while if the radiation transmitted through the test sheet drops below that transmitted by the master sheet by a predetermined tolerance, the other of the relays will close its bridging contact.

Power from a direct-current source 95A is controlled by the bridging contacts 79 through 82A to connect this source with one polarity to the field winding of a direct-current motor 96A and to energize the armature thereof, to rotate the latter in one direction when the relay 78 closes the bridging contacts, and to rotate the latter in the opposite direction when the relay 77 closes its bridging contacts. The motor 96A controls the spacing between the rolls 97, 98 acting on the sheet 1 and thereby determining the thickness of the latter. Thus as long as the thickness of the sheet 1 equals the thickness of the master sheet 11, both the relays 77 and 78 remain open circuited and the motor 96A remains deenergized. However, if the thickness of the roll sheet falls below that of the sample, the relay 78 will close its bridging contacts to rotate the motor 96A and increase the spacing between the rolls 97 and 98, whereas if the thickness of the rolled sheet is greater than that of the sample at any instant, the relay 77 will close its bridging contacts to rotate the motor 96A to decrease the spacing between the rolls 97 and 98.

Turning now to the X-ray tube stabilizer H, it is designed to maintain the anode current of the X-ray tubes A and B constantly coupled to each other in spite of any unwanted variations in their cathode-heating currents or the like.

The circuit of this X-ray tube stabilizer is the joint invention of R. L. Wright and W. N. Lundahl and is separately described and claimed in Patent No. 2,492,304, granted December 27, 1949 for "X-Ray Tube Stabilizers."

In this stabilizer the cathodes of the X-ray tubes A and B are respectively connected to the grounded terminals of the transformer secondaries 6 and 16 which supply these tubes with anode voltage through windings 101 and 102 positioned on the magnetic cores of the respective transformer primaries 7 and 17. In series with the windings 101 and 102 are two equal resistors 103 and 104 having their opposite terminals connected to the anodes of a pair of substantially identical diode rectifiers which may continuously be embodied in an electron tube 105. The cathodes associated in the tube 105 respectively with the above-mentioned anodes are connected to ground through a pair of similar variable resistors 107 and 108 which are respectively shunted by capacitors 109 and 110.

The right-hand cathode of the double diode 105 is connected to the cathode of an amplifier tube 111 having an anode supplied with current from a voltage source 112 through a winding 113 positioned on a magnetic core 113A to control the degree of saturation thereof. The control electrode of the tube 111 is connected to the left-hand cathode of the double diode 105 through a resistor 114 and a bias battery 115. The resistor 114 is shunted by an "anti-hunting" or feed-back circuit of the type described in the pending application of Charles T. Zavales, Serial No. 617,625, filed September 20, 1945, and assigned to the same assignee as the present invention. Inasmuch as such anti-hunting circuit per se forms no part of the present invention, it is believed unnecessary to describe such arrangement in detail herein, since reference thereto can be had from such copending application. Suffice it to say that such anti-hunting circuit, as indicated by the block diagram in Fig. 2, comprises a feed-back transformer having its primary winding connected in series with a winding 116 on the magnetic core 113A having the saturation controlled by the winding 113 and with a primary winding 117 associated with the secondary winding 5 to supply heat and current to the cathode of the X-ray tube A, and also with a transformer 118 supplied from the alternating-current source 8. The feed-back transformer is thus subjected to the voltage drop through the reactor windings 113—116 and winding 117 of the cathode heating transformer for X-ray tube A.

This voltage is then boosted by the feed-back transformer of the anti-hunt arrangement by a center tapped step-up secondary winding which is connected to a full-wave rectifier valve and to a resistor connected in parallel in the resistor 114 through a filter arrangement including a capacitor. Under normal conditions in which no oscillations occur in the X-ray tube milliamperage and hence in the filament heating circuit for the cathode of X-ray tube A, no change occurs in the voltage impressed across resistor 114 from the anti-hunt arrangement. If, however, oscillations should occur in the cathode circuit and in the milliamperage of the X-ray tube, a pulsating voltage appears across the resistor of the anti-hunt arrangement which pulsations are transmitted by the anti-hunt capacitor to resistor 114. This, in turn, causes this rapidly changing voltage across resistor 114 to effect the control grid of tube 105 thereby reducing the magnitude of these oscillations since tube 105 affects the voltage across the resistors 103 and 104 included in the milliamperage energizing circuit for the X-ray tubes A and B.

It will be evident, upon examination, from the above description that the anode current of the X-ray tube A will flow to earth through the resistor 103 and the channel comprising the right-hand diode in the tube 105 and the resistor 107 which is in parallel with resistor 103. Similarly, the anode current of the X-ray tube B will flow to earth through the resistor 104 and the channel comprising the left-hand diode in the tube 105 and the resistor 108. It will be clear that when the anode current of the X-ray tubes A and B are equal to each other, the potential drops in the resistors 103 and 104 are equal and opposite to each other and correspondingly the potential difference between the opposite terminals of the resistors 107 and 108 is zero. The latter potential difference, in series with the bias voltage source 115 and the resistor 114 is impressed between the cathode and the control electrode of the amplifier tube 111 and will fix the value of the direct current in the winding 113 which controls the saturation of the magnetic core for the winding 116. The winding 116 accordingly constitutes a saturable reactor controlled in value by the direct current through the tube 111 and variation of the latter will accordingly control the voltage impressed on the primary winding 117 from the source 118. The net result of the foregoing situation is that the potential difference between the opposite terminals of the resistors 107 and 108 will control the cathode temperature of the X-ray tube A. The initial value of the heating current for the cathode of either the tube A or B may be initially adjusted by varying the voltage sources 112 or 115 or by varying the tap point on the transformer 118 so that the anode currents of the X-ray tubes A and B have the desired equal values at which they are to be maintained. If thereafter the anode current of the tube A increases above the value of the anode current of the tube B, a potential difference will be produced across the outside terminals of the resistors 107 and 108 which will make the control grid of the tube 111 less positive, thereby decreasing current flow through the winding 113. This winding is so poled as to decrease the saturation in the magnetic core for the winding 116, thereby increasing its reactance and decreasing the heating current for the cathode of X-ray tube A. In consequence the anode current of the tube A will decrease to substantial equality with that of the X-ray tube B.

Should the anode current of the X-ray tube A become smaller than that of the X-ray tube B, the opposite effects on the amplifier tube 111 and the reactance of the winding 116 to those above described will obviously follow, with the result that the anode current of the X-ray tube A will be raised to equality with that of the X-ray tube B. The stabilizer H is thus an effective agency to maintain equality of currents at all times through two electron tube circuits such as those of the X-ray tubes A and B.

It will be noted that the interposition of the diode rectifiers in tube 105 ahead of the resistors 107 and 108 insures that any alternating current due to distributed capacitance between the windings of the transformers supplying power to X-ray tubes A and B will be excluded from effect on the grid potential of the amplifier tube 111. The capacitors 109 and 110 filter out any ripples in the voltages impressed by the anode currents of the two X-ray tubes A and B across the resistors 107 and 108.

It is desirable in order to give a visual indication of any failure of the control system to maintain equality of thickness of the rolled sheet 1 with the master sheet 11, and also to assist in setting the voltage of tubes A and B, by adjusting autotransformer 8, so that for the desired thickness of sheet 1 the photo-multiplier tube C will operate at its most sensitive range, to have a simple visual indication of the value of the voltage being applied to the electrode 22B in the photo-multiplier 22. While a vacuum tube voltmeter might seem ideal from a technical standpoint for this purpose, such an instrument is relatively expensive and difficult to maintain in adjustment. I have accordingly provided the indicator K of a novel type for determination of the value of the above-mentioned voltage. For this purpose, I have employed what may be termed a twin indicator electron ray tube of which the 6AF6-G is an example now on the market. To suit the present purposes, this measuring device must have an input circuit of relatively high impedance. Thus I connect a pair of resistors 132, 133 between the electrode 22A and ground and connect their common terminal to one of the deflector electrodes of the tube 131. The cathode of the tube 131 is grounded and its anode is connected through a resistor 134 to any convenient source of positive potential such as the positive line 25. Between this positive line and the cathode, a resistor 135 having a variable tap is connected to the other deflecting electrode of the tube 131. An ordinary direct-current voltmeter 136 is connected to measure the voltage of the last-mentioned deflector electrode and the cathode.

Figure 10:
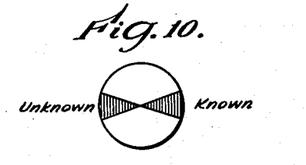
Figs. 10 and 11 are diagrams illustrating the appearance of a fluorescent screen forming the indicating device of the indicator designated K in Figs. 1 and 2.
Figure 11:
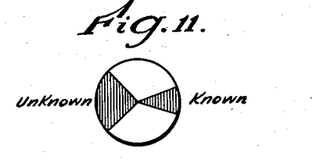

The tube 131 operates by bombarding a fluorescent screen incorporated therein with electrons from its cathode, to produce two bright and two dark sectors on this screen. When the voltages impressed on its two deflector electrodes are equal to each other, the two dark sectors are of approximately equal area and have the appearance shown in Fig. 10. On the other hand, when one of the voltages is greater than the other, the areas of the two dark sectors are different so that they have an appearance such as is indicated in Fig. 11. In order to measure the voltage applied between the electrode 22A and ground, the variable tap on the resistor 135 is moved until the screen of the tube 131 has the appearance of Fig. 10 and the value of the voltage is then read off from the voltmeter 136.

It may be noted that the photo-multiplier stabilizer D protects the photo-multiplier tube C, should sheet 1 be removed, by reducing the potential of electrodes 22A and 22B so that injurious currents cannot flow.

While I have applied this voltage-measuring device in connection with the X-ray thickness gauge described in this application, it is a measuring instrument of general applicability to many purposes which will be evident to those skilled in the art. For instance, the relays 77 and 78 may control selectivity equipment of types well known in the art for segregating sheets above or below a predetermined thickness into separate piles or the like, instead of for operating the roll screw-down motor 96.

I claim as my invention:

1. In an X-ray thickness gauge for measuring material thickness of the type having means for generating two independent X-ray beams, light producing means responsive to the intensity of the respective X-ray beams impinging thereon after passage through a material of known thickness and a material of unknown thickness, light sensitive means responsive to said light producing means and operable to produce a pulsating voltage corresponding to any difference in the intensity of said X-ray beams as a measure of the deviation in the thickness of the unknown material from that of the material of known thickness, the combination with said light sensitive means of a discriminator arrangement for producing an output voltage responsive in magnitude and sign to the relative amplitudes of alternately succeeding pulses produced by said light sensitive means, said discrimination arrangement comprising an inleading wire for connection to said light sensitive means and to the positive terminal of a direct-current source, a pair of electron tubes each embodying a set of principal electrodes and two control electrodes, means for connecting the principal electrodes of both said tubes in series with said inleading wire and direct-current source through a pair of resistors having a common terminal, means for connecting one of said electrodes in each said tube to the opposite terminals of a source of alternating current, means for connecting the other said control electrodes together to be energized by the pulsating wave from said light sensitive means, and means for connecting the non-common terminals of said resistors to a utilization circuit.

2. In an X-ray thickness gauge for measuring material thickness of the type having means for generating two independent X-ray beams, light producing means responsive to the intensity of the respective X-ray beams impinging thereon after passage through a material of known thickness and a material of unknown thickness, light sensitive means responsive to said light producing means and operable to produce a pulsating voltage corresponding to any difference in the intensity of said X-ray beams as a measure of the deviation in the thickness of the unknown material from that of the material of known thickness, the combination with said light sensitive means of a discriminator arrangement for producing an output voltage responsive in magnitude and sign to the relative amplitudes of alternately succeeding pulses in a periodic voltage wave produced by said light sensitive means said discriminator arrangement comprising an inleading wire for connection to said light sensitive means and to the positive terminal of a direct-current source, a pair of electron tubes each embodying a set of principal electrodes and two control electrodes, means for connecting the principal electrodes of both said tubes in series with said inleading wire and direct-current source through a pair of resistors having a common terminal, means for connecting one of said control electrodes in each said tube to the opposite terminals of a source of alternating current having a periodicity equal to that of the pulsating wave from said light sensitive means, means for connecting the other said control electrodes together to be energized by the pulsating wave from said light sensitive means, and means for connecting the non-common terminals of said resistors to a utilization circuit.

3. In an X-ray thickness gauge for measuring material thickness of the type having means for generating two independent X-ray beams, light producing means responsive to the intensity of the respective X-ray beams impinging thereon after passage through a material of known thickness and a material of unknown thickness, light sensitive means responsive to said light producing means and operable to produce a pulsating voltage corresponding to any difference in the intensity of said X-ray beams as a measure of the deviation in the thickness of the unknown material from that of the material of known thickness, the combination with said light sensitive means of a discriminator arrangement for producing an output voltage responsive in magnitude and sign to the relative amplitudes of alternately succeeding pulses in a periodic direct-current voltage wave produced by said light sensitive means said discriminator arrangement comprising an inleading wire for connection to said light sensitive source, a pair of electron tubes each embodying a set of principal electrodes and two control electrodes, means for connecting the principal electrodes of both said tubes in series with said inleading wire and direct-current source through a pair of resistors having a common terminal, means for connecting one of said electrodes in each said tube to the opposite terminals of a source of alternating current having a periodicity equal to that of said pulsating source from said light sensitive means, means for connecting the other said control electrodes together to be energized by the pulsating wave from said light sensitive means, and means for connecting the non-common terminals of said resistors to a utilization circuit.

4. In an X-ray thickness gauge for measuring material thickness of the type having means for generating two independent X-ray beams, light producing means responsive to the intensity of the respective X-ray beams impinging thereon after passage through a material of known thickness and a material of unknown thickness, light sensitive means responsive to said light producing means and operable to produce a pulsating voltage corresponding to any difference in the intensity of said X-ray beams as a measure of the deviation in the thickness of the unknown material from that of the material of known thickness, the combination with said light sensitive means of a discriminator arrangement for producing an output voltage responsive in magnitude and sign to the relative amplitudes of alternately succeeding pulses in a periodic voltage wave produced by said light sensitive means said discriminator arrangement comprising an inleading wire for connection to said light sensitive means and to the positive terminal of a direct-current source, a pair of similar electron tubes each embodying a set of principal electrodes and two control electrodes, means for connecting the principal electrodes of both said tubes in series with said inleading wire and direct-current source through a pair of resistors having a common terminal, means for connecting one of said control electrodes in each said tube to the opposite terminals of a source of alternating current having a periodicity equal to that of said pulsating source from said light sensitive means, means for connecting the other said control electrodes together to be energized by the pulsating wave from said light sensitive means, and means for connecting the non-common terminals of said resistors to a utilization circuit.

5. In an X-ray thickness gauge for measuring material thickness of the type having means for generating two independent X-ray beams, light producing means responsive to the intensity of the respective X-ray beams impinging thereon after passage through a material of known thickness and a material of unknown thickness, light sensitive means responsive to said light producing means and operable to produce a pulsating voltage corresponding to any difference in the intensity of said X-ray beams as a measure of the deviation in the thickness of the unknown material from that of the material of known thickness, the combination with said light sensitive means of a discriminator arrangement for producing an output voltage responsive in magnitude and sign to the relative amplitudes of alternately succeeding pulses in a periodic voltage wave produced by said light sensitive means said discriminator arrangement comprising an inleading wire for connection to said light sensitive means and to the positive terminal of a direct-current source, a pair of electron tubes each embodying a set of principal electrodes and two control electrodes, means for connecting the principal electrodes of both said tubes in series with said inleading wire and direct-current source through a pair of equal resistors having a common terminal, means for connecting one of said control electrodes in each said tube to the opposite terminals of a source of alternating current having a periodicity equal to that of said pulsating source from said light sensitive source, means for connecting the other said control electrodes together to be energized by the pulsating wave from said light sensitive means, and means for connecting the non-common terminals of said resistors to a utilization circuit.

6. In an X-ray thickness gauge for measuring material thickness of the type having means for generating two independent X-ray beams, light producing means responsive to the intensity of the respective X-ray beams impinging thereon after passage through a material of known thickness and a material of unknown thickness, light sensitive means responsive to said light producing means and operable to produce a pulsating voltage corresponding to any difference in the intensity of said X-ray beams as a measure of the deviation in the thickness of the unknown material from that of the material of known thickness, the combination with said light sensitive means of a discriminator arrangement for producing an output voltage responsive in magnitude and sign to the relative amplitudes of alternately succeeding pulses in a periodic direct-current voltage wave produced by said light sensitive means said discriminator arrangement comprising an inleading wire for connection to said light sensitive means and to the positive terminal of a direct-current source, a pair of similar electron tubes each embodying a set of principal electrodes and two control electrodes, means for connecting the principal electrodes of both said tubes in series with said inleading wire and direct-current source through a pair of equal resistors having a common terminal, means for connecting one of said control electrodes in each said tube to the opposite terminals of a source of alternating current having a periodicity equal to that of said pulsating source from said light sensitive means, means for connecting the other said control electrodes together to be energized by the pulsating wave from said light sensitive means, and means for connecting the non-common terminals of said resistors to a utilization circuit.

7. In an X-ray thickness gauge for measuring material thickness of the type having means for generating two independent X-ray beams, light producing means responsive to the intensity of the respective X-ray beams impinging thereon after passage through a material of known thickness and a material of unknown thickness, light sensitive means responsive to said light producing means and operable to produce a pulsating voltage corresponding to any difference in the intensity of said X-ray beams as a measure of the deviation in the thickness of the unknown material from that of the material of known thickness, the combination with said light sensitive means of a sensitivity control network for accentuating the relative differences between successive pulsations in a periodic voltage wave produced by said light sensitive means said sensitivity control network comprising an electron tube having a pair of principal electrodes and a control electrode, means for causing direct current flow between said principal electrodes from a source independent of the pulsating voltage wave from said light sensitive means, an input circuit for impressing said pulsations from said light sensitive means on said control electrode which embodies a variable resistor in series with a network comprising a rectifier which is shunted by a source of direct-current voltage separate from that supplied to said principal electrodes together with a resistor in series with said direct-current source, and means connecting the output circuit of said sensitivity control network to a utilization circuit.

8. In an X-ray thickness gauge for measuring material thickness of the type having means for generating two independent X-ray beams, light producing means responsive to the intensity of the respective X-ray beams impinging thereon after passage through a material of known thickness and a material of unknown thickness, light sensitive means responsive to said light producing means and operable to produce a pulsating voltage corresponding to any difference in the intensity of said X-ray beams as a measure of the deviation in the thickness of the unknown material from that of the material of known thickness, the combination with said light sensitive means of a sensitivity control network for accentuating the relative differences between successive pulsations in a periodic voltage wave produced by said light sensitive means said sensitivity control network comprising an electron tube having a pair of principal electrodes and a control electrode, means for causing direct current flow between said principal electrodes from a source independent of the pulsating voltage from said light sensitive means, an input circuit for impressing said pulsations from said light sensitive means on said control electrode, said input circuit embodying a variable resistor in series with a capacitor and with a network comprising a rectifier which is shunted by a source of direct-current voltage separate from that supplied to said principal electrodes together with a resistor in series with said direct-current source, and means connected to the output circuit of said sensitivity control network to a utilization circuit.

WALTER N. LUNDAHL.

References Cited in the file of this patent

UNITED STATES PATENTS

| Number | Name | Date |
|---|---|---|
| 1,869,209 | Mead | July 26, 1932 |
| 1,977,619 | Boyer | Oct. 23, 1934 |
| 2,154,492 | Clough | Apr. 18, 1939 |
| 2,175,690 | Happe, Jr. | Oct. 10, 1939 |
| 2,219,506 | Steimel et al. | Oct. 29, 1940 |
| 2,233,199 | Donley | Feb. 25, 1941 |
| 2,264,725 | Shoupp et al. | Dec. 2, 1941 |
| 2,296,092 | Crosby | Sept. 15, 1942 |
| 2,301,635 | Norton | Nov. 10, 1942 |
| 2,346,486 | Hare | Apr. 11, 1944 |
| 2,349,429 | Herzog et al. | May 23, 1944 |
| 2,356,567 | Cockrell | Aug. 22, 1944 |
| 2,419,546 | Grieg | Apr. 29, 1947 |
| 2,438,947 | Rieke | Apr. 6, 1948 |
| 2,467,812 | Clapp | Apr. 19, 1949 |
| 2,469,206 | Rich | May 3, 1949 |